Oct. 14, 1930.  D. W. SIEBERT  1,778,513
FOOT SUPPORT FOR CHILDREN'S VEHICLES
Filed Jan. 3, 1929  2 Sheets-Sheet 1

Inventor
Donald W. Siebert
By Attorneys

Oct. 14, 1930.  D. W. SIEBERT  1,778,513
FOOT SUPPORT FOR CHILDREN'S VEHICLES
Filed Jan. 3, 1929  2 Sheets-Sheet 2

Inventor
Donald W. Siebert
By Attorneys

Patented Oct. 14, 1930

1,778,513

UNITED STATES PATENT OFFICE

DONALD W. SIEBERT, OF GARDNER, MASSACHUSETTS, ASSIGNOR TO O. W. SIEBERT COMPANY, OF GARDNER, MASSACHUSETTS, A CORPORATION OF MASSACHUSETTS

FOOT SUPPORT FOR CHILDREN'S VEHICLES

Application filed January 3, 1929. Serial No. 329,994.

This invention relates to a child's vehicle of the type in which a small child may be transported in a sitting position or in which a child may propel itself after the fashion of a baby walker or a so-called "kiddie car".

A removable foot well for such a vehicle is shown and described in the prior application of Otto W. Siebert, Serial No. 80,974, filed January 13, 1926. The foot well therein shown is made of cloth or fabric and is well adapted to the use of very small children but is not particularly adapted to the use of larger children.

It is the general object of my invention to provide a foot support for a child's vehicle which is readily foldable to inoperative position when not in use and in which the parts are of a substantial and rigid construction well adapted to resist unusual strains or excessive wear.

My invention further relates to arrangements and combinations of parts which will be hereinafter described and more particularly pointed out in the appended claims.

A preferred form of the invention is shown in the drawings in which

Figure 1:
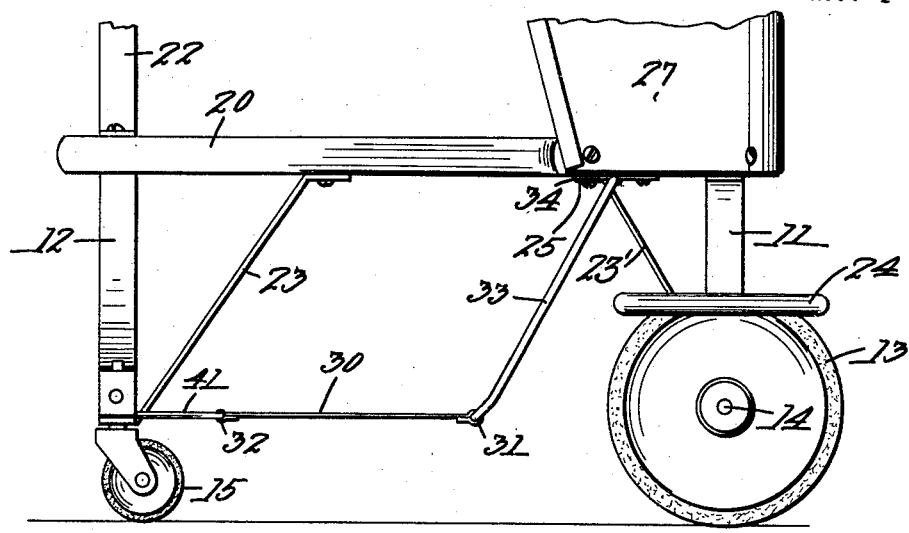
Fig. 1 is a side elevation of a child's vehicle embodying my improvements.

Referring to the drawings, I have shown my improvements embodied in a child's vehicle of a quite usual type, having a seat 10 mounted on a rear frame member 11 and a front frame member 12. Rear wheels 13 are mounted on an axle 14 (Fig. 4) secured in the lower ends of the rear frame member 11. Front wheels 15 are mounted on swivel bearings at the two sides of the front frame member 12.

The seat 10 has a narrow forwardly extending portion 20 supported on the front frame member 12. Upwardly projecting handle supports 22 are secured on the seat portion 20 and are surmounted by a fixed handle, not shown.

A rubber covered bumper or fender 24 is secured to the rear frame 11 and projects outward over the rear wheels 13 to protect furniture therefrom.

A brace 23 is secured at its lower end to the lower part of the frame member 12 and at its upper end to the under side of the seat portion 20. The upper end of a similar brace 23' is secured at 25 to the under side of the seat 10 and at its lower end the brace 23' encircles the middle of the rear axle 14, as shown at 26 in Fig. 5.

Figure 2:
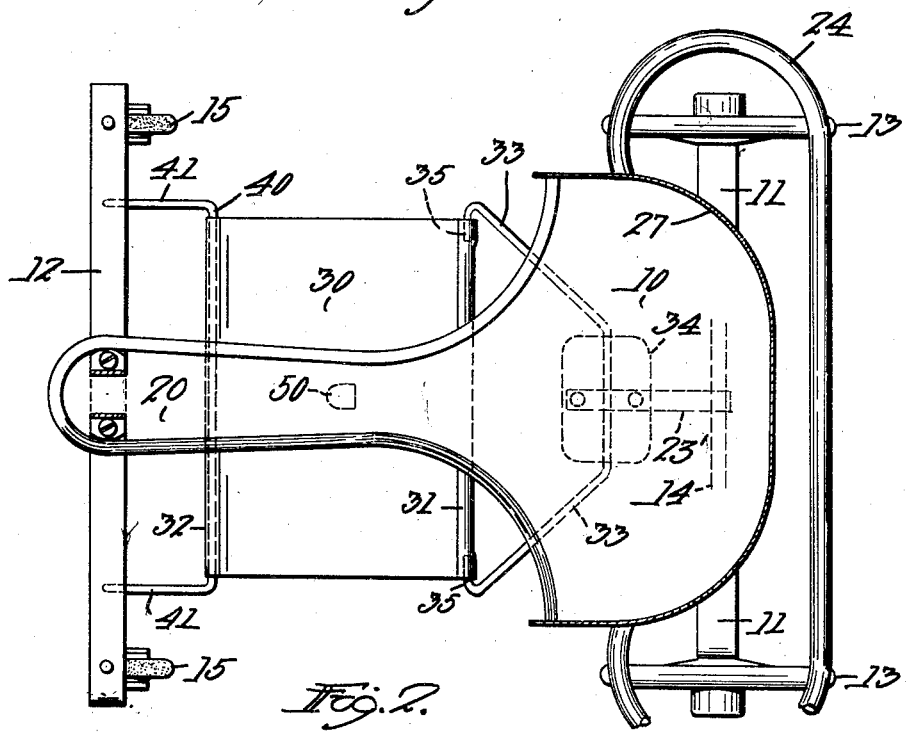
Fig. 2 is a plan view thereof.

A back support or enclosure 27 extends upward from the seat 10 and may project forwardly at the sides thereof, as indicated in Figs. 1 and 2.

The vehicle thus far described is in general of a usual commercial type and in itself forms no part of my present invention, which relates more particularly to the provision of an improved foot support in such a vehicle.

My improved foot support comprises a foot plate 30, preferably formed of sheet metal and preferably having the ends bent to provide transversely extending bearing or hinge portions 31 and 32, as indicated in Fig. 1.

A swinging foot plate support 33 is pivotally secured at its middle portion to the under side of the seat 10 by a bearing plate 34. The end portions of said support 33 extend downward and spread laterally, and the extreme ends 35 are offset inwardly, as indicated in Fig. 2.

The inwardly projecting ends 35 are received in the bearing portion 31 at the rear of the foot plate 30. The support 33 is preferably formed from a single piece of wire or rod, as indicated in Fig. 2.

A foot plate attaching member 40 is also preferably formed from a single piece of wire or rod and extends through the bearing portion 32 of the foot plate 30. Its end portions 41 are bent forward substantially at right angles to the middle or bearing portion thereof and are then offset downwardly, as indicated at 42 in Fig. 4. The downward projections 42 are received in suitably positioned holes in the connecting lower portion 45 (Fig. 3) of the front frame member 12.

Figure 3:
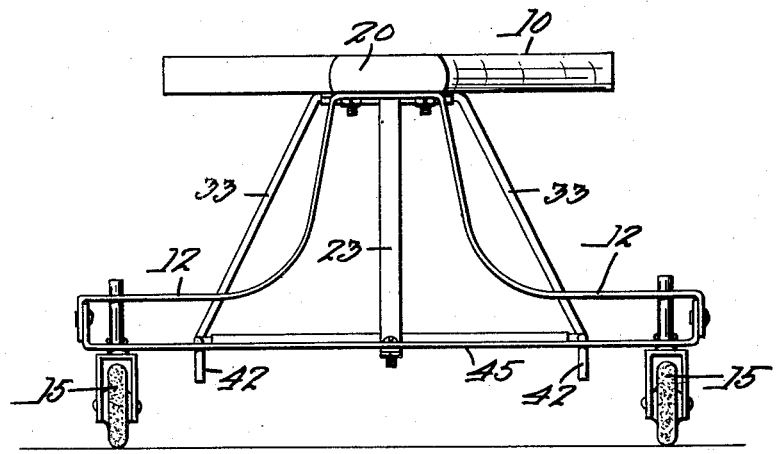
Fig. 3 is a front elevation thereof.

When the foot plate attaching member 40 is thus secured to the portion 45 of the front frame member 12, the foot plate 30 is firmly supported in the position shown in Figs. 1, 2 and 3, and the feet of a child placed on the seat 10 will be comfortably supported by the plate 30.

Figure 6:
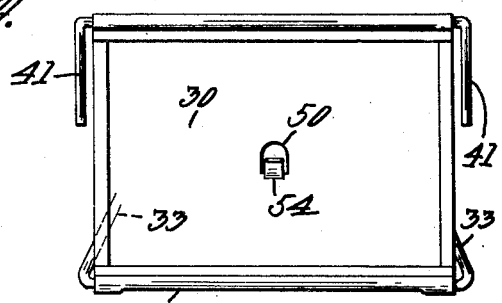
Fig. 6 is a front view of the folded support, looking in the direction of the arrow 6 in Fig. 5.

An opening 50 (Fig. 6) is formed near the center of the foot plate 30 and a spring latch 52 (Fig. 4) is mounted on the back brace 24 and projects forwardly therefrom. The latch 52 is provided with a downwardly curved end portion 54.

Figure 4:
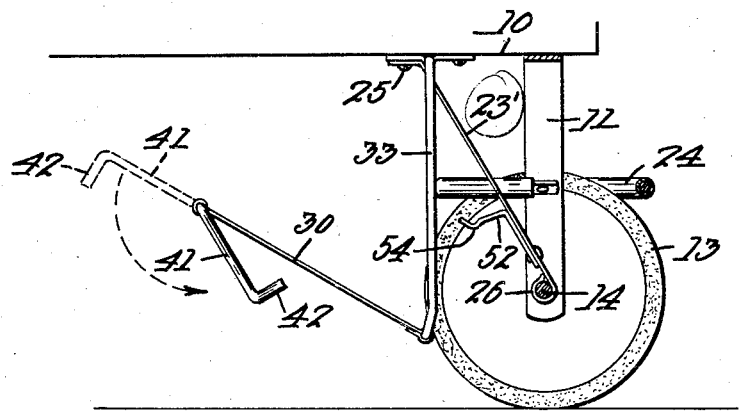
Figs. 4 and 5 are partial side elevations, showing successive steps in the folding of the foot support to inoperative position.
Figure 5:
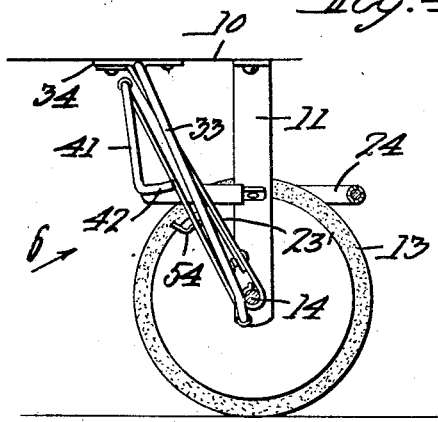

When the foot support is not to be used, the ends 42 of the attaching member 40 are lifted out of the openings in the front frame portion 45 and the attaching member 40 is then folded back to the position indicated in Figs. 4 and 5.

The foot plate 30 is then swung upwardly about its pivotal connection with the swinging foot plate support 33 and the foot plate support itself is then swung rearward against the rear axle 14 and between the wheels 13.

As the parts approach final folded position, the spring latch 52 passes through the opening 50 in the foot plate 30 and is slightly raised by engagement of the plate 30 with the downwardly curved end portion 54 of the latch.

As the plate 30 reaches folded position, the downwardly curved end portion 54 projects through the opening 50 and moves downward to its original position, thus yieldingly holding the foot plate in folded or inoperative position.

I have thus provided a foot support having all parts of a strong and rigid construction, while at the same time my improved foot support may be conveniently moved to inoperative position when desired, and may be stored out of the way beneath the seat 10 when the vehicle is to be used as a baby walker or kiddie car.

My improved foot support thus posesses important advantages and constitutes a marked improvement over the foot supports previously used for the same or similar purposes.

Having thus described my invention and the advantages thereof, I do not wish to be limited to the details herein disclosed, otherwise than as set forth in the claims, but what I claim is:—

1. In a child's vehicle having a front running gear, a substantially rigid foot plate, a swinging support on said vehicle engaging the rear edge portion of said plate, an attaching device foldably mounted on said plate and adapted to detachably engage a rigid portion of said running gear to secure said plate in operative position, and means to secure said plate and attached parts in folded inoperative position beneath the rear part of said vehicle.

2. In a child's vehicle having a front running gear, a substantially rigid foot plate, a swinging support on said vehicle engaging the rear edge portion of said plate, an attaching device pivoted to the front edge portion of said plate and adapted to detachably engage a rigid portion of said running gear to secure said plate in operative position, said device being foldable on said plate and said plate being foldable on said swinging support, and means to secure said parts in inoperative position beneath the rear part of said vehicle.

3. In a child's vehicle having a front running gear, a seat, a foot plate, a support therefor pivoted at its upper end to said seat and at its lower end to the rear edge portion of said plate, means on said plate and engageable with said running gear, to support the front edge portion of said plate in operative position, and means to hold said parts in folded position beneath said seat.

4. In a child's vehicle having a front running gear, a seat, a foot plate, a support therefor pivoted at its upper end to said seat and at its lower end to the rear edge portion of said plate, means detachably engageable with said running gear to support the front edge portion of said plate in operative position, and a latch engaging said plate when said plate is in inoperative position and effective to hold said parts in folded position beneath said seat.

5. In a child's vehicle having a front running gear, a seat, a foot plate, a support therefor pivoted at its upper end to said seat and at its lower end to the rear edge portion of said plate, means engageable with said running gear to support the front edge portion of said plate in operative position, said plate having a center opening therein, and a spring latch mounted in fixed position beneath said seat and adapted to yieldingly engage the lower edge of said opening when said plate is in folded inoperative position.

6. In a child's vehicle having a front running gear, a seat, a substantially rigid foot plate comprising a metal sheet having oppositely disposed rolled edges, a swinging support for said plate pivoted to said seat and having a portion pivotally engaged with one of said edges, a second supporting member pivotally engaged with the other of said rolled edges and having a portion engageable with said running gear, said supporting members and said plate being relatively foldable from an operative position to an inoperative position beneath the rear part of said vehicle.

7. In a child's vehicle having a front running gear, a seat, a substantially rigid foot plate comprising a metal sheet having oppositely disposed rolled edges, a swinging support for said plate pivoted to said seat and having a portion pivotally engaged with one of said edges, a second supporting member pivotally engaged with the other of said rolled edges and having a portion engageable with said running gear, said supporting members and said plate being relatively foldable from an operative position to an inoperative position beneath the rear part of said vehicle, and means to secure said plate in folded inoperative position.

8. In a child's vehicle, having a front running gear, a substantially rigid foot plate, a swinging support for the rear edge portion of said plate permanently connected to said portion and to the vehicle, means connected to the front edge portion of said plate and detachably engageable with said running gear when said plate is in operative position thereby to support said front edge portion, and retaining means engageable with the plate to secure said plate in inoperative position under the rear portion of said vehicle.

In testimony whereof I have hereunto affixed my signature.

DONALD W. SIEBERT.